United States Patent [19]

Stokes

[11] Patent Number: 5,354,003

[45] Date of Patent: Oct. 11, 1994

[54] TRASH PLANT STEM SHREDDING APPARATUS

[76] Inventor: Ralph E. Stokes, P.O. Box 79 WeeWaa, NSW 2388, Australia

[21] Appl. No.: 137,839

[22] Filed: Oct. 15, 1993

[51] Int. Cl.⁵ .................. B02C 9/02; B02C 21/02; A01D 35/26
[52] U.S. Cl. .................. 241/101.7; 241/222; 241/243; 56/14.3
[58] Field of Search ............ 241/101.7, 222, 243, 241/282.1, 292.1; 56/14.3, 503, 500

[56] References Cited

U.S. PATENT DOCUMENTS

| | | | |
|---|---|---|---|
| 3,873,038 | 3/1975 | Wagstaff | 241/282.2 |
| 3,945,177 | 3/1976 | Scott et al. | 56/12.7 |
| 4,350,207 | 9/1982 | Ben-Dor | 171/58 |
| 4,459,796 | 7/1984 | Stokes | 56/14.3 |
| 4,678,129 | 7/1987 | Dallinger | 241/101.7 |
| 4,747,260 | 5/1988 | Petrasch et al. | 56/505 |
| 4,751,812 | 6/1988 | Lubetzky et al. | 56/504 |

*Primary Examiner*—Mark Rosenbaum
*Assistant Examiner*—John M. Husar
*Attorney, Agent, or Firm*—Poms, Smith, Lande & Rose

[57] ABSTRACT

A trash plant stem shredder having vertically stacked pairs of parallel, frictionally engaged contra-rotating uprooting rollers are carried by a frame and towed behind a vehicle. The uprooting rollers are tilted forward such that, when a trash plant stem which remains in the ground after harvesting an agricultural product from the plant, enters the nips of the rollers, the stem is uprooted and moved rearwardly along the frame. A contra-rotating feed roller is disposed rearwardly of the uprooting rollers and in abutting relationship thereto, and feeds the stem to a shredder which includes a plurality of vertically stacked cutter units that longitudinally shear or shred the stem into small sections which are scattered and allowed to biodegrade in the field and fertilize the soil. Each cutter unit includes a stationary blade having a leading edge that extends closely adjacent to the feed roller and a rotary cutter blade which is spaced rearward of the feed roller to inhibit accumulation of debris and blockage of the shredder.

10 Claims, 3 Drawing Sheets

TRASH PLANT STEM SHREDDING APPARATUS

BACKGROUND OF THE INVENTION

1. Field of the Invention

The present invention generally relates to the art of agriculture, and more specifically to an apparatus for shredding trash plant stems which remain standing in a field after an agricultural product has been harvested from the plants.

2. Description of the Related Art

The present invention constitutes an improvement to an apparatus disclosed in my U.S. Pat. No. 4,459,796, entitled "GATHERING PLANT TRASH", issued Jul. 17, 1984. My prior apparatus automates and greatly facilitates the uprooting and shredding of trash plant stems from row crops such as cotton and pineapple that remain in the ground after the agricultural product has been harvested from the plants. This operation has previously been performed manually in a highly labor and time intensive manner.

My prior apparatus includes vertically stacked pairs of parallel, frictionally engaged contra-rotating uprooting rollers which are carried by a frame that is towed behind a vehicle. The uprooting rollers are tilted forward such that when a trash plant stem enters the nips of the rollers, the stem is uprooted and moved rearwardly to a shredder which includes a plurality of vertically stacked cutter units that longitudinally shear or shred the stem into small sections which are scattered onto the field. The shredded stems are sterilized by ultraviolet rays in the sunlight, and allowed to biodegrade and fertilize the soil.

Although generally quite effective, my prior apparatus is vulnerable to accumulation of shredded debris in the spaces between the rollers and the shredder, as well as in the shredder itself. This can cause blockage and stoppage of the apparatus, as well as accelerated wear and/or damage to the rollers caused by abrasion with accumulated debris.

Another limitation of my prior apparatus is that the assembly by which the apparatus is attached to a vehicle for towing is relatively inflexible in the vertical direction. As a result, the apparatus can be jarred or damaged by abutment of the lower portion thereof against mounds or other hard upstanding irregularities in the ground surface.

SUMMARY OF THE INVENTION

An apparatus for shredding trash plant stems in accordance with the present invention comprises vertically stacked pairs of parallel, frictionally engaged contra-rotating uprooting rollers carried by a frame which is towed behind a vehicle.

The uprooting rollers are tilted forward such that when a trash plant stem that remains in the ground after harvesting an agricultural product from the plant enters the nips of the rollers, the stem is uprooted and moved rearwardly along the frame.

A pair of radially spaced, contra-rotating feed rollers are disposed rearward of the uprooting rollers, and feed the stem to a shredder which includes a plurality of vertically stacked cutter units that longitudinally shear or shred the stem into small sections which are scattered and allowed to biodegrade in the field and fertilize the soil.

The feed rollers are disposed closely adjacent to and rotate in the same direction as the respective uprooting rollers such that the adjacent surfaces of the rollers move in opposite directions, thereby clearing each other of debris and promoting rearward movement of the stem.

Each cutter unit includes a stationary blade having a leading edge that extends closely adjacent to one of the feed rollers and a rotary cutter blade which is spaced rearward of the feed rollers to inhibit accumulation of debris and blockage of the shredder.

Each cutter unit further includes a diverter blade having a leading edge that extends tangential to the periphery of the respective rotary blade to further enhance movement of debris out of the shredder.

The apparatus further comprises an improved towing assembly including a pivotal link which enables the apparatus to ride smoothly over upstanding irregularities in the ground surface.

It is an object of the present invention to improve on my prior trash plant stem gathering apparatus by facilitating the movement of shredded debris out of the apparatus and preventing accumulation, blockage and damage caused by such debris.

It is another object of the present invention to provide an improved towing assembly which prevents the apparatus from being jarred and/or damaged when operated on rough ground.

These and other features and advantages of the present invention will be apparent to those skilled in the art from the following detailed description, taken together with the accompanying drawings, in which like reference numerals refer to like parts.

DETAILED DESCRIPTION OF THE INVENTION

Figure 1:
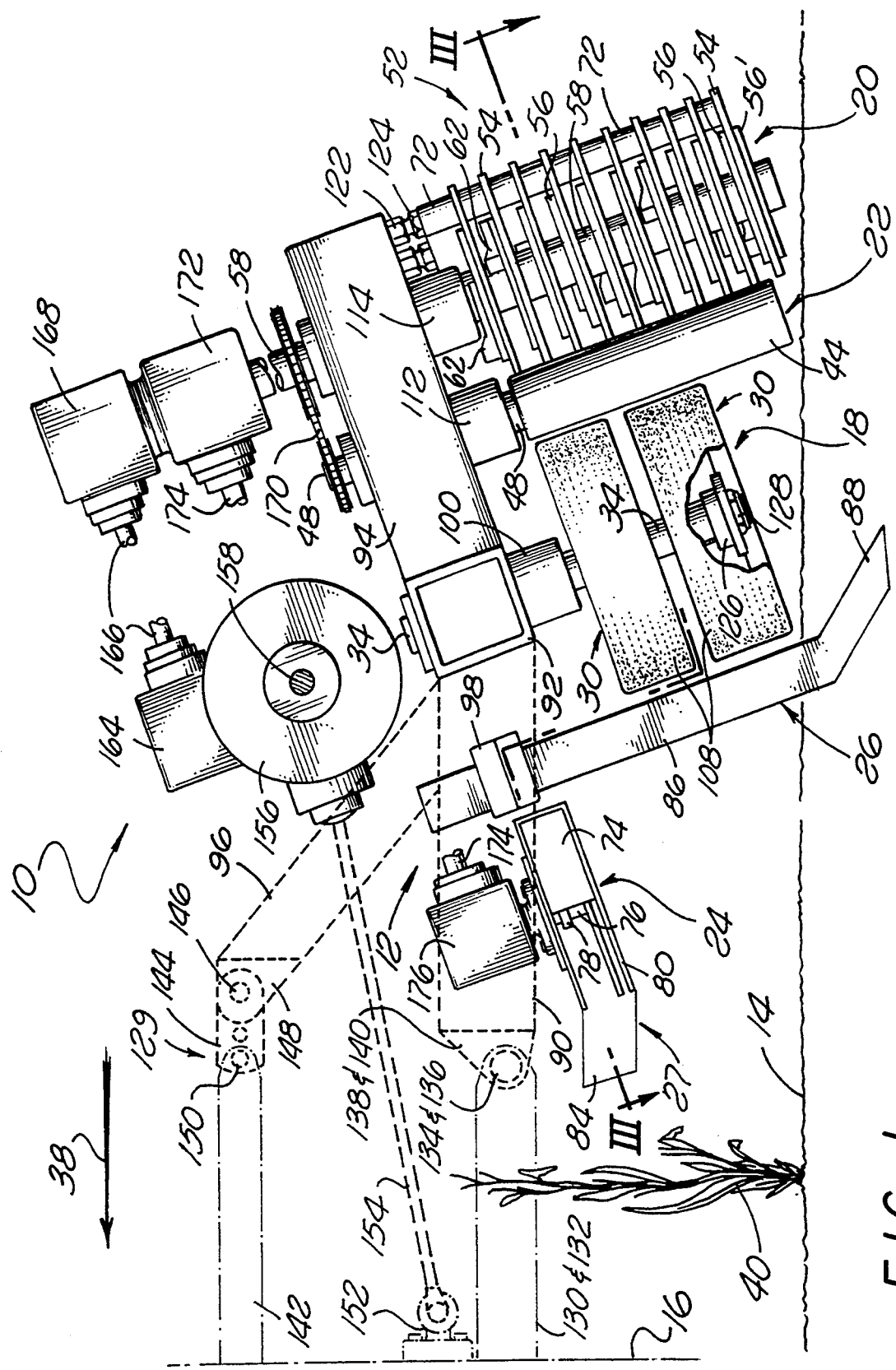
FIG. 1 is a side elevation of a trash plant stem shredding apparatus embodying the present invention.
Figure 2:
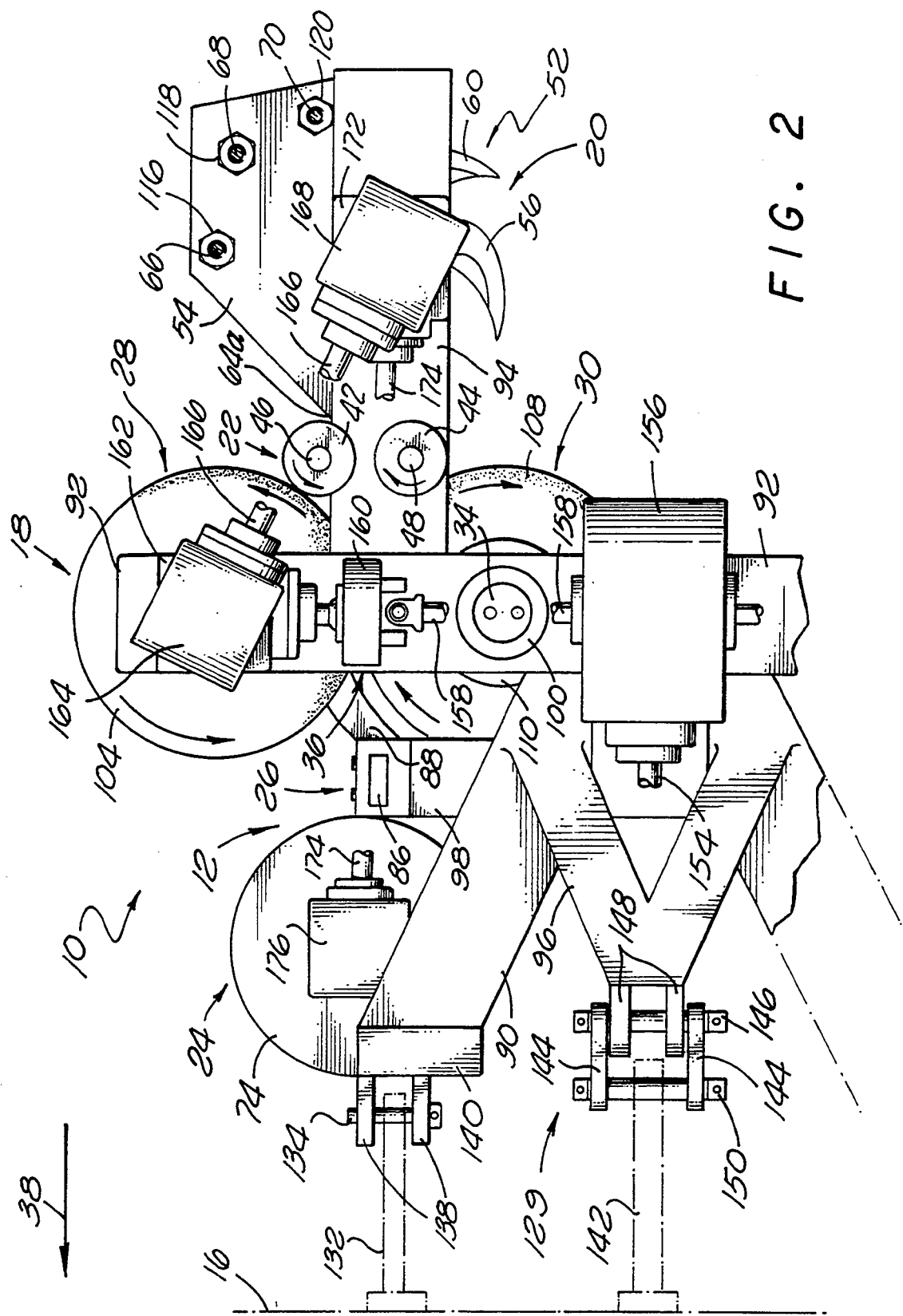
FIG. 2 is a plan view of the apparatus.
Figure 3:
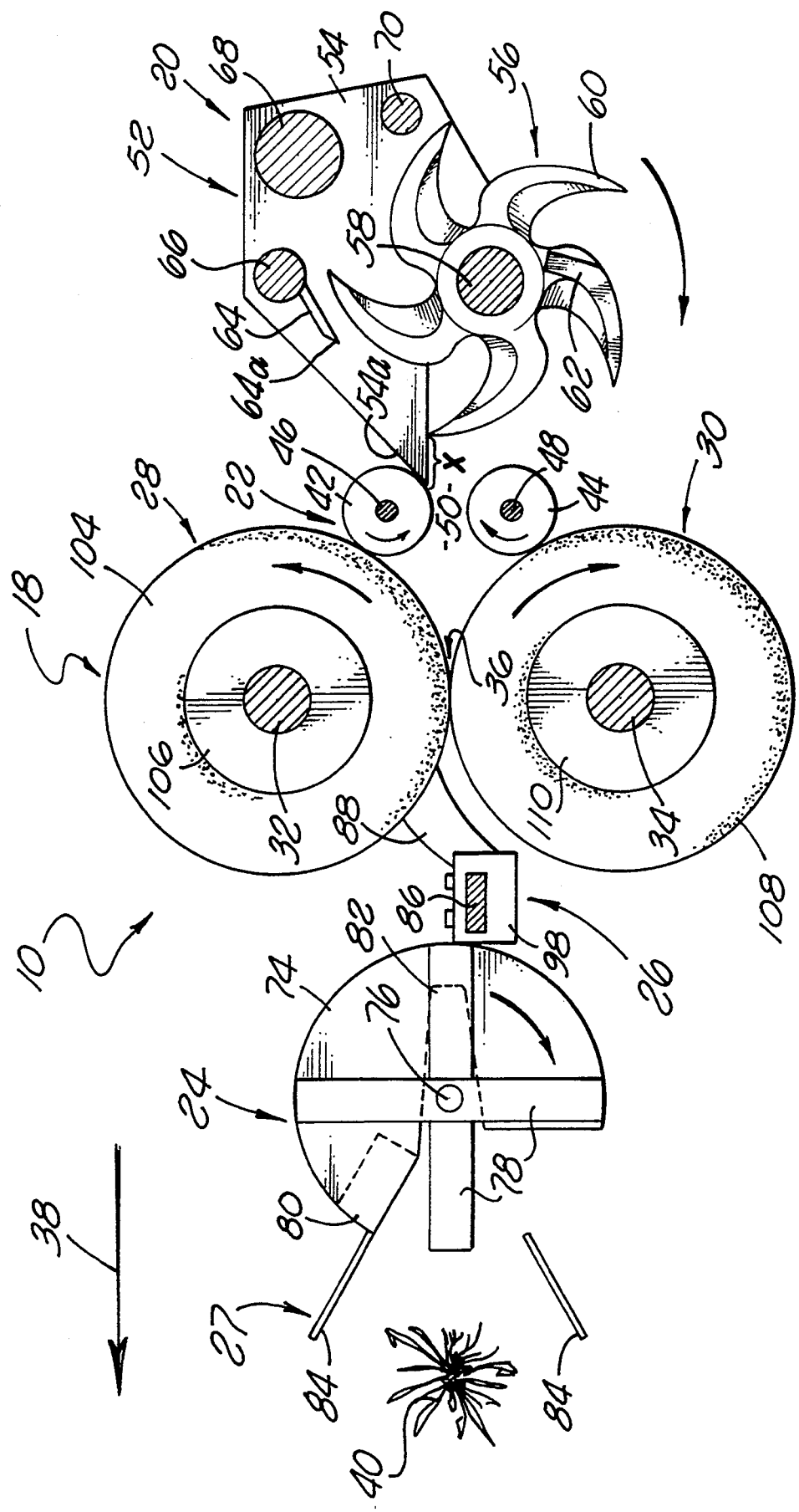
FIG. 3 is a section taken on a line III—III of FIG. 1.

As illustrated in FIGS. 1 to 3 of the drawings, a trash plant stem shredding apparatus embodying the present invention is generally designated by the reference numeral 10, and comprises a frame 12 which is towed along the ground 14 by a vehicle as symbolically indicated at 16.

The frame 12 supports the functional assemblies of the apparatus 10, including an uprooting roller unit 18, a shredder unit 20, a feed roller unit 22, a slasher unit 24, a soil breaking knife unit 26 and a guide-wing unit 27.

The uprooting roller unit 18 comprises at least one pair, here illustrated as two pairs, of parallel, frictionally engaged, contra-rotating uprooting rollers 28 and 30. The rollers 28 are vertically stacked on and fixed to a shaft 32 for unitary rotation, whereas the rollers 30 are vertically stacked on and fixed to a shaft 34, similarly for unitary rotation. The rollers 28 and 30 are contra-rotationally driven as indicated by arrows and define flattened chordal areas or nips 36 at their areas of frictional engagement as illustrated in FIG. 3.

The frame 12 and the assemblies carried thereby are tilted forward for operation as illustrated in FIG. 1, where a forward direction of movement parallel to the longitudinal axis of the apparatus 10 is leftward as indicated by an arrow 38. A rearward direction is defined as rightward, or opposite to the arrow 38.

Due to the forward operational tilt of the frame 12, the shafts 32 and 34 and thereby the rollers 28 and 30 are also tilted forward. The apparatus 10 is towed forwardly by the vehicle 16 along a crop row such that trash plant stems 40 which remain after harvesting of an agricultural product therefrom enter the guide-wing unit 27 and are guided thereby into the nips 36 of the rollers 28 and 30.

The force applied by the rollers 28 and 30 to the stems 40 lies in a vertical plane passing through the nips 36 and is perpendicular to the axes of the shafts 32 and 34. This applied force has a vertically upward component and a rearward component. The upward force component causes the stems 40 to be gently uprooted, whereas the rearward force component causes the stems 40 to be moved rearwardly through the feed roller unit 22 to the shredder unit 20.

The feed roller unit 22 comprises a pair of parallel elongated, radially spaced feed rollers 42 and 44 which are fixed to shafts 46 and 48 for unitary rotation therewith respectively. The rollers 42 and 44 are contra-rotated in the same direction as the rollers 28 and 30 respectively.

Whereas the rollers 28 and 30 frictionally engage with each other to effectively uproot the stems 40, the rollers 42 and 44 are spaced from each other such that the stems 40 are moved through a gap 50 between the rollers 42 and 44 to the shredder unit 20.

As illustrated in FIG. 3, the feed rollers 42 and 44 are spaced rearward of and closely adjacent to the uprooting rollers 28 and 30 respectively, with the surfaces of the rollers 42, 28 and 44, 30 moving in opposite directions at their points of near tangency. By this arrangement, any debris from the stems 40 which begins to accumulate on the rollers 28 and 30 is swept off by the rollers 42 and 44, and vice-versa.

Any debris which begins to accumulate in the area surrounded by the rollers 28, 30, 42 and 44, including debris swept off these rollers, is carried by the rollers 42 and 44 and the stems 40 rearwardly through the gap 50, thereby preventing accumulation of debris in the area of the rollers 28, 30, 42 and 44 which could cause blockage of the apparatus and/or damage to the rollers.

The rollers 42 and 44, which constitute one improvement of the present invention over the apparatus disclosed in my above referenced prior patent, serve the functions of moving the stems 40 from the uprooting roller unit 18 to the shredder unit 20, removing and discharging any debris which may begin to accumulate in the areas of the rollers 28, 30, 42 and 44 and clearing the rollers 28 and 30 of debris.

The shredder unit 20 comprises a plurality of vertically stacked cutter units 42, each including a stationary cutter blade 54 and a rotating cutter blade 56. The blades 56 are fixed to a shaft 58, and integrally rotate clockwise therewith as indicated by an arrow in FIG. 3. The rotating cutter blades 56 are disposed closely adjacent to the respective stationary cutter blades 54 along the axis of the shaft 58, thereby cooperating therewith to perform a scissoring or shearing action that cuts the stems 40.

As the stems 40 pass through the shredder unit 20, they are longitudinally shredded or cut into sections by the cutter units 52. The shredded sections are scattered rearwardly from the apparatus 10, and allowed to biodegrade on the ground 14. Ultraviolet rays from the sun sterilize the shredded stems, which become fertilizer after they have decomposed.

As illustrated in FIG. 3, the rotating cutter blade 56 includes a plurality of elongated, hooked teeth 60 which assist in capturing and feeding the stems 40 rearwardly through the apparatus 10 in addition to their primary cutting or shearing function. Each blade 56 is generally planer, and a stiffener 62 that extends perpendicularly away from the surfaces of the blades 56 is provided on each blade 56. The stiffeners 62 serve the functions of increasing the rigidity and strength of the teeth 60, and breaking up any debris which may begin to accumulate in the spaces between adjacent cutter units 52.

It will be noted that the lowermost cutter unit 52 has an additional rotary cutter blade 56' disposed below the fixed cutting blade 54, which is not formed with a stiffener 62.

The shredder unit 20 incorporates additional improvements in accordance with the present invention to inhibit blockage of the apparatus 10 by debris from the stems 40, and facilitate the efficient movement of the stems 40 through and out of the apparatus 10. As illustrated in FIG. 3, each stationary cutter blade 54 has a leading edge 54a which extends closely adjacent to the roller 42. The leading edges 54a as shaped in this manner serve as guides, and improve the effectiveness by which the stems 40 are moved from the feed rollers 42 and 44 to the rotating cutter blades 56.

The cutter units 52 are further configured such that the radially outermost peripheries or tips of the teeth 60 of the blades 56 are spaced from the feed rollers 42 and 44 by a distance x, which is larger than the spacing between the leading edges 54a of the blades 54 and the rollers 42 and 44. The distance x is selected empirically, and may differ depending on the type of crop being processed. As a general rule, the distance x is made large enough such that debris will not accumulate between the rollers 42, 44 and the blade 56, and small enough such that the effectiveness by which the stems 40 are moved through the apparatus 10 is not compromised.

The cutter units 52 further include diverter blades 64 which are fixed to the stationary cutter blades 54 rearward of the rollers 42 and 44 and radially outward of the rotating cutter blades 56. The diverter blades 64 have leading edges 64a which are closely adjacent to and preferably extend tangent to the peripheries of the blades 56. As viewed in FIG. 3, any debris passing above the diverter blade 64 is scattered from the cutter unit 52 in a generally upward (actually transverse) direction, whereas any debris passing below the diverter blade 64 is forcibly discharged rightwardly (actually rearwardly) by the blade 56.

The stationary cutting blades 54 are stacked and retained in longitudinal or vertical alignment by shafts 66, 68 and 70. The vertical spacing between adjacent blades 54 is maintained by tubular spacers 72 through which the shafts 66, 68 and 70 extend.

The slasher unit 24 includes a housing 74 in which a shaft 76 is supported for rotation parallel to the shafts 32 and 34. Two rotating cutter blades 78 are fixed to the shaft 76 for integral rotation therewith at a right angle to each other. The blades 78 are spaced from each other along the shaft 76 as illustrated in FIG. 1. A stationary cutter blade 80 is provided on the lower wall of the housing 74 closely adjacent to the lower blade 78 to perform a shearing action in cooperation therewith that cuts the stems 40. The upper blade 78 assists in the cutting action, and further facilitates discharge of the upper portions of the stems 40 in an area indicated at 82.

The slasher unit 24 cuts off the upper portions of the stems 40 above the nip 36 of the upper uprooting rollers 28 and 30 before the stems 40 reach the uprooting roller unit 18, and scatters the cut-off tops onto the ground. It will be noted the slasher unit 24 is optional, and may not be required if the stems 40 are sufficiently short.

The guide-wing unit 27 comprises two laterally spaced guide-wings 84 which extend angularly outward from the housing 74 to converge and guide the stems 40 into the slasher unit 24.

The knife unit 26 includes a shank 86 which extends downwardly from the frame 12 and terminates in a curved knife blade 88. As viewed in FIG. 3, the shank 86 is disposed below (actually transversely of) the nip 36 of the rollers 28 and 30, and the blade 88 curves upwardly (actually transversely) to extend forward of the nip 36.

The knife unit 26 is disposed forward of the uprooting roller unit 18 such that the knife blade 88 moves underneath the surface of the ground 14 and breaks up the soil in front of and alongside the stems 40 just before the stems 40 enter the nips 36 of the rollers 28 and 30. This makes it easier for the rollers 28 and 30 to uproot the stems 40, and is especially desirable where the soil is hard.

The frame 12 comprises a bifurcated, generally longitudinally extending main spinal member 90. A transversely extending main cross-member 92 is welded or otherwise integrally fixed to the member 90. A branch member 94 extends rearwardly from the cross-member 92. A bifurcated outrigger 96 extends longitudinally forward from the spinal member 90, whereas a short arm member 98 extends transversely from the member 90.

The housing 74 of the slasher unit 24 is fixedly supported by the upper (visible in FIG. 2) bifurcation of the main spinal member 90. The shank 86 of the knife unit 26 is supported by the short arm member 98. The shaft 34 is supported in a bearing sleeve 100 which is fixed to the cross-member 92, whereas the shaft 32 is supported in a similar bearing sleeve which is not visible in the drawings.

The roller 28 may typically comprise a conventional automotive type tire 104 which is mounted on a hub 106 that is in turn fixed to the shaft 32. The roller 30 similarly comprises a tire 108 and hub 110.

The shaft 48 for the feed roller 44 is supported by a bearing sleeve 112 which extends from the branch member 94. The shaft 46 is supported by a similar bearing sleeve which is not visible in the drawings. The shaft 58 of the shredder unit 20 is supported by a bearing sleeve 114 which also extends from the member 94.

The shafts 66, 68 and 70 have threaded upper ends which are retained by nuts 116, 118 and 120 respectively. A tubular double nut assembly 122, 124 is provided around each shaft 66, 68 and 70 between the branch member 94 and the top spacer 70 to enable adjustment of the vertical gap between the blades 54 and 56 of the cutter units 52. To perform the adjustment, the nuts 66, 68 and 70 are loosened, and the assembly 122, 124 is screwed in or out to vary the spacing between the top spacer 72 and the member 94. Increasing this spacing increases the gap between the blades 54 and 56, and vice-versa.

The rollers 28 and 30 are detachably mounted on the shafts 32 and 34 respectively by hub assemblies 126 and locknuts 128.

The apparatus 10 further includes an improved towing assembly 129 for attaching the frame 12 to the vehicle 16. A three point linkage as is provided on a conventional tractor includes two arms 130 and 132 which are pivotally connected to the bifurcations of the spinal member 90 by first pivot pins 134 and 136 and flanges 138 and 140, respectively, which enable the frame 12 to pivot vertically about the pins 134 and 136.

Another arm 142 of the three point linkage extends from the vehicle 16 above and transversely centered between the arms 130 and 132. The rearward ends of links 144 are pivotally connected to the forward end of the outrigger 96 by a second pivot pin 146 and flanges 148, whereas the forward ends of the links 144 are pivotally connected to the arm 142 by a third pivot pin 150. The links 144 are vertically pivotal about the pin 150, whereas the outrigger 96 is vertically pivotal about the pin 146.

The towing assembly 129 including the links 144 constitutes an improvement over my prior apparatus in that it enables the apparatus 10 to move smoothly over rough ground without being jarred or damaged through abutment against mounds and other hard, upstanding irregularities in the ground surface.

The frame 12 is vertically pivotal about the first pins 134 and 136. Extending or retracting the arm 142, which is located above the pins 134 and 136, enables the apparatus 10 to be rotated about the pins 134 and 136 to a desired operating height above the ground. The arm 142 can be further retracted to elevate the apparatus 10 to an inoperative position with extended ground clearance for transporting the apparatus 10 from one site to another.

The links 144 enable the apparatus 10 to rotate counterclockwise about the pins 134 and 136 as viewed in FIG. 1 if the rollers 42 and 44 and/or the lower end of the shredder unit 20 engages an upstanding irregularity in the surface of the ground 14. In this case, the links 144 will rotate counterclockwise about the pin 150, thereby allowing movement of the pin 146 relative to the pin 150.

This enables the apparatus 10 to ride smoothly over the irregularity. In my prior apparatus which does not include the links 144, such rotational movement is not possible, and the rigid attachment of the apparatus to the vehicle via the three point linkage prevents the apparatus from riding over irregularities independently of the vehicle, resulting in jarring and/or damage as described above.

The rotational units of the apparatus 10 are driven from the vehicle 16 via a rotary power take-off 152, a main drive shaft 154 and a miter gear box 156 which is mounted on the cross-member 92. The shaft 32 for the uprooting rollers 28 is driven from the gear box 156 via a lateral shaft 158, a torque limiting coupler 160 and a gear box 162. The uprooting rollers 30 are not driven directly, but are idlers, and are frictionally driven for contra-rotation by the respective rollers 28.

The shaft 58 of the shredder unit 20 is driven from the shaft 32 via a gear box 164 which is mounted on the cross-member 92, a drive shaft 166, and a gear box 168 which is mounted on the branch member 94. The shafts 46 and 48 for the rollers 42 and 44 are driven from the shaft 58 via a belt or chain 170. The shaft 76 of the slasher unit 24 is driven from the shaft 58 via a gear box 172 which is mounted on the branch member 94, a drive shaft 174 and a gear box 176 which is mounted on the slasher housing 74.

The direct drive mechanism of the present apparatus 10 is yet another improvement over the friction drive arrangement of my prior apparatus in that it substantially improves the ability of the apparatus 10 to be driven under heavy loading conditions.

While an illustrative embodiment of the invention has been shown and described, numerous variations and alternate embodiments will occur to those skilled in the art, without departing from the spirit and scope of the invention.

For example, the apparatus can incorporate its own engine for driving the operating units carried by the frame, can be provided with wheels so as to roll over the ground, and/or can be self-propelled.

Accordingly, it is intended that the present invention not be limited solely to the specifically described illustrative embodiment. Various modifications are contemplated and can be made without departing from the spirit and scope of the invention as defined by the appended claims.

I claim:

1. A plant stem shredding apparatus which is movable forwardly along the ground into engagement with a vertically extending plant stem to be shredded, comprising:
    a pair of parallel, frictionally engaged contra-rotating uprooting rollers for uprooting and moving said stem rearwardly upon entry of said stem into a nip defined between the uprooting rollers;
    a shredder which is disposed rearwardly of the uprooting rollers for shredding said stem; and
    feed roller means in abutting relationship with one of said uprooting rollers and in contra-rotation therewith for preventing said stem from moving past said feed roller means when it engages the same and conveying said stem from the uprooting rollers directly to the shredder.

2. An apparatus as in claim 1, in which the uprooting rollers have rotational axes which tilt forwardly such that the uprooting rollers urge said stem upwardly and rearwardly.

3. An apparatus as in claim 1, in which said roller means includes at least one roller disposed closely rearward of and rotating in a same direction as one of the uprooting rollers respectively.

4. An apparatus as in claim 1, in which the shredder comprises:
    a stationary cutter blade having a leading edge that extends closely adjacent to said feed roller means; and
    a rotary cutter blade which cooperates with the stationary cutter blade for shearing said stem and is spaced from said feed roller means by a distance that is larger than a distance by which said leading edge of the stationary cutter blade is spaced from said feed roller means.

5. An apparatus as in claim 1, in which the shredder comprises:
    a stationary cutter blade;
    a rotary cutter blade which cooperates with the stationary cutter blade for shearing said stem; and
    a diverter blade which is fixed to the stationary cutter blade, spaced rearward of said feed roller means, spaced radially outward of the rotary cutter blade and has a leading edge that extends closely adjacent to a peripheral edge of the rotary cutter blade.

6. An apparatus as in claim 5, in which said leading edge of the diverter blade extends substantially tangent to said peripheral edge of the rotary cutter blade.

7. An apparatus as in claim 1, in which the shredder comprises:
    a stationary cutter blade;
    a generally planar rotary cutter blade that cooperates with the stationary cutter blade for shearing said stem; and
    trash material cleaning means extending perpendicularly from the rotary cutter blade and adapted to engage the stationary cutter blade when the rotary cutter blade is rotated into engagement therewith for cleaning any trash material off of said stationary cutter blade.

8. An apparatus as in claim 1, further comprising:
    a frame for supporting the uprooting rollers, the feed rollers and the shredder; and
    a towing assembly for enabling the frame to be towed by a vehicle, including:
        a first pivot for vertically pivotally attaching a lower portion of the frame to the vehicle;
        a link;
        a second pivot for vertically pivotally attaching the link to an upper portion of the frame; and
        a third pivot for vertically pivotally attaching the link to the vehicle.

9. An apparatus as in claim 1, further comprising a slasher which is disposed forward of the uprooting rollers for cutting off an upper portion of said stem above said nip.

10. An apparatus as in claim 1, further comprising a knife blade that extends into and breaks the ground forward of said nip.

* * * * *